US011724326B1

(12) United States Patent
Zhou et al.

(10) Patent No.: US 11,724,326 B1
(45) Date of Patent: Aug. 15, 2023

(54) METHOD AND DEVICE FOR LIQUID SPRAY SOLDERING AND THE APPLICATION METHOD THEREOF

(71) Applicant: Shenzhen Anewbest Electronic Technology Co., Ltd., Guangdong (CN)

(72) Inventors: Xuan Zhou, Guangdong (CN); Zhengdong Tan, Guangdong (CN); Haiying Wang, Guangdong (CN); Yunfeng Cai, Guangdong (CN); Haiming Wang, Guangdong (CN); Junkuan Du, Guangdong (CN); Shihong Cai, Guangdong (CN); Yanling Huang, Guangdong (CN); Shengli Li, Guangdong (CN)

(73) Assignee: Shenzhen Anewbest Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/901,650

(22) Filed: Sep. 1, 2022

(30) Foreign Application Priority Data

Mar. 3, 2022 (CN) .......................... 202210204097.2

(51) Int. Cl.
*B23K 1/00* (2006.01)
*B23K 3/00* (2006.01)
(Continued)

(52) U.S. Cl.
CPC ............ *B23K 1/06* (2013.01); *B05B 17/0661* (2013.01); *B05B 17/0669* (2013.01); *B23K 3/08* (2013.01)

(58) Field of Classification Search
CPC .......... B23K 3/0607; B23K 1/06; B23K 3/06; B23K 35/025; B23K 26/1437; B23K 26/1462; B23K 3/0653
See application file for complete search history.

(56) References Cited

U.S. PATENT DOCUMENTS 3,222,776 A * 12/1965 Kawecki .................. B23K 1/06
164/466
3,298,030 A * 1/1967 Brown, Jr. ................ G06F 3/06
178/30
(Continued)

FOREIGN PATENT DOCUMENTS

| CN | 102335743 A | 2/2012 |
|---|---|---|
| CN | 103785834 A | 5/2014 |

(Continued)

*Primary Examiner* — Erin B Saad
(74) *Attorney, Agent, or Firm* — Dragon Sun Law Firm; Nathaniel Perkins

(57) ABSTRACT

The disclosure relates to the field of spray welding, and involves a method and a device for liquid spray welding, as well as the application method thereof. The method for liquid spray welding specifically comprises the following steps: S1: Solder to be spray-soldered is melted under the protection of an inert gas; S2: Then, the melted solder is spray-soldered while using ultrasonic focusing. The device includes a solder conversion mechanism which consists of a container; the cavity in the container is used for placing the solder; a spraying hole is arranged at the bottom of the container to connect with the cavity, and a heating mechanism is mounted along the outer wall of the container; a device for driving the solder spraying is used to control the frequency of an ultrasonic generating mechanism.

6 Claims, 3 Drawing Sheets

(51) Int. Cl.
 *B23K 1/06* (2006.01)
 *B05B 17/06* (2006.01)
 *B23K 3/08* (2006.01)

(56) References Cited

U.S. PATENT DOCUMENTS

| | | | | |
|---|---|---|---|---|
| 3,373,436 | A * | 3/1968 | Auphan | G01D 15/18 347/82 |
| 3,463,365 | A * | 8/1969 | Dumont-Fillon | G01N 15/12 164/489 |
| 4,349,829 | A * | 9/1982 | Bovio | B41J 2/04 347/88 |
| 4,398,589 | A * | 8/1983 | Eldred | H02K 44/06 164/337 |
| 4,459,601 | A * | 7/1984 | Howkins | B41J 2/14201 347/68 |
| 4,684,956 | A * | 8/1987 | Ball | B41J 2/01 106/31.62 |
| 4,812,856 | A * | 3/1989 | Wallace | B41J 2/175 347/89 |
| 4,961,455 | A * | 10/1990 | Redemske | B22D 39/003 164/147.1 |
| 5,193,738 | A * | 3/1993 | Hayes | H05K 3/3489 228/205 |
| 5,229,016 | A * | 7/1993 | Hayes | B23K 3/0623 222/593 |
| 5,598,200 | A * | 1/1997 | Gore | B41J 2/14008 347/88 |
| 6,439,689 | B1 * | 8/2002 | Silverbrook | B41J 2/1639 347/54 |
| 7,129,166 | B2 * | 10/2006 | Speakman | H01M 10/052 257/E29.151 |
| 8,011,757 | B2 * | 9/2011 | Silverbrook | B41J 2/04543 347/50 |
| 8,016,909 | B2 * | 9/2011 | Wheeler | C09C 1/622 75/331 |
| 10,315,247 | B2 * | 6/2019 | Mark | B22F 10/32 |
| 11,448,967 | B2 * | 9/2022 | Vaschenko | C23C 4/123 |

FOREIGN PATENT DOCUMENTS

| | | |
|---|---|---|
| CN | 104190570 A | 12/2014 |
| CN | 105522246 A | 4/2016 |
| CN | 108853855 A | 11/2018 |
| CN | 110158082 A | 8/2019 |
| CN | 112024886 A | 12/2020 |
| CN | 112025022 A | 12/2020 |
| KR | 20200140090 A | 12/2020 |

* cited by examiner

METHOD AND DEVICE FOR LIQUID SPRAY SOLDERING AND THE APPLICATION METHOD THEREOF

CROSS-REFERENCE TO RELATED APPLICATION

This application claims priority from the Chinese patent application 202210204097.2 filed on Mar. 3, 2022, the content of which is incorporated herein in the entirety by reference.

TECHNICAL FIELD

The present disclosure pertains to the field of spray soldering, particularly to a method for liquid spray soldering.

The disclosure is also related to a device that enables the method for liquid spray soldering and an application method of the device.

BACKGROUND OF THE PRESENT DISCLOSURE

A traditional process of laser soldering such as spray tin ball laser soldering (laser tin spray) is more suitable for fine soldering or soldering in a small space when compared with conventional soldering methods. It boasts the advantages of great thermal effects and is not prone to cause secondary thermal shock to electronic components. However, the laser tin spray makes use of inert gas to provide power for the molten tin balls which should not be located too far from the solder joints; otherwise, adverse effects will be produced when soldering. Meanwhile, chip encapsulation requires that solder of the solder joints be stacked, so that there is a variable distance between each solder joint and the substrate. When the chip is partially under impact, it is necessary to have a satisfactory variable allowance which can eliminate the stress caused by the impact and thus prevent adverse effects on other solder joints. However, for the purpose of stacking solder joints in the production process, it is necessary to ensure coaxiality occurs during continuous soldering. During the process of laser tin spray, shielding gas is employed as an impetus and the sprayed gas has certain effects on the position where the solder joints fall. The technique of laser tin spray neither allows surfacing nor ensures the same verticality on the same solder joint. At the same time, the application scope of the laser tin spray technique is restricted because it does not allow frequent soldering operations. Moreover, spray soldering is affected by the diameter of the tin ball, and is not applicable to the scenario of soldering in a small space.

Therefore, the method and device that allow the spray of liquid solder at a high speed to form desired solder joints, as well as the application method of the device are currently not available.

SUMMARY OF THE PRESENT DISCLOSURE

To address a technical issue, this disclosure provides a method for liquid spray soldering, which enables the rapidly sprayed liquid solder to form the desired solder joints.

To address another technical issue, this disclosure provides a device for enabling the aforesaid method.

To address another technical issue, this disclosure provides a method for the application of the aforesaid device.

The method for liquid solder soldering is comprised of the following steps:

A method for liquid spray soldering is characterized in that it is comprised of the following steps:

S1: The solder to be spray-soldered is molten under the protection of an inert gas;

S2: Then the molten solder is spray-soldered under the condition of ultrasonic focusing;

As an improvement of the method for liquid spray soldering as stated in the disclosure, it also comprises:

S3: The sprayed solder enters an oxygen barrier area designed for sonic waves, and is spray-soldered under an oxygen barrier condition with sonic waves;

As an improvement of the method for liquid spray soldering as stated in the disclosure, when the molten solder is sprayed through the spraying hole, the switching frequency of the spraying hole is set.

As an improvement of the method for liquid spray soldering as stated in the disclosure, the oxygen barrier area with sonic waves is the place with thin air covered by the sonic wave.

This disclosure provides a device that enables the aforesaid method for liquid spray soldering. It comprises:

The solder conversion mechanism that allows the solder to be spray-soldered to melt and involves the use of a container; the cavity in the container is used for placing the solder materials; a spraying hole is arranged at the bottom of the container to connect with the cavity, and a heating mechanism is mounted along the outer wall of the container;

The device for driving the solder spraying is equipped with both ultrasonic generating and ultrasonic controlling mechanisms for controlling the frequency in the ultrasonic generating mechanism; one of these mechanisms extends into the cavity and is immersed in the ultrasonic focusing mechanism in the liquid solder; the focusing mechanism includes an ultrasonic focusing device for focusing ultrasonic waves at the spraying hole;

As an improvement of the device as stated previously, an oxygen barrier mechanism is located on both sides of the spraying path of solders; the oxygen barrier mechanism includes sonic wave generating and enhancing mechanisms for reinforcing the wave produced in the sonic wave generating mechanism and for applying the enhanced sonic wave around the spraying hole.

As an improvement of the device as stated previously, the cavity of the container is connected to a gas booster that has been filled with an inert gas under a closed condition and is used to enhance the air pressure above the solder liquid level in the cavity.

As an improvement of the device as stated previously, the spraying hole is small in the middle, and gradually increases in size from the middle to the inlet and outlet ends.

As an improvement of the device as stated previously, the ultrasonic generating mechanism also is comprised of a piezoelectric ceramic controlled by pulse signals; the container is a crucible; a spraying switch capable of controlling the switching frequency is provided on the spraying hole; the sonic wave generating mechanism is a waveform generator; an acoustic cavity is arranged between the waveform generator and the loudspeaker; the spraying hole is mounted along the direction of gravity; a heat insulator is provided on the ultrasonic generating and focusing mechanisms; a heat insulating layer is provided outside the container.

The application method for the device of a liquid solder spray solder as stated in the disclosure is comprised of the following steps:

A1: The spraying hole is closed and solid solder materials are added into the container;

A2: The heating mechanism is turned on. This allows the solder materials to change from a solid to a liquid state, and then keeps the solder materials in a liquid state all the time;

A3: The ultrasonic generating, controlling and focusing mechanisms are turned on; the ultrasound is focused on the spraying hole, and the spraying hole is opened for spray soldering;

A4: A spraying switch is provided on the spraying hole (102); the switching frequency of the spraying hole and the ultrasonic frequency of the ultrasonic generating mechanism are adjusted to make the two frequencies positively correlated;

A5: An oxygen barrier mechanism is provided on both sides of the spraying path; the oxygen barrier mechanism is comprised of sonic wave generating and enhancing mechanisms for reinforcing the waves generated in the sonic wave generating mechanism and for applying the effects of reinforced sonic waves around the spraying hole; the air molecules in the space around the spraying hole form air waves under the action of sonic waves. Accordingly, the spraying hole is located at a place where the air is thin in the air wave. This can isolate the spraying hole from oxygen in the ambient atmosphere, until the spray soldering is completed.

The present disclosure has the following beneficial effects:

1. The present disclosure makes use of ultrasonic focusing to drive the spray soldering process. It has properly resolved the problem of insufficient driving force of ultrasonic vibration extrusion spray droplets when the diameter of the spraying hole is less than 50 μm, compared with the driving force arising from the ultrasonic vibration;

2. For the disclosure, the protective solution of an oxygen barrier is applied on the position of spraying holes using sonic waves. As a substitute for the conventional approach of using an inert gas or a vacuum, it has expanded the application scope of the spray soldering technique, while reducing the complexity and cost of an oxygen barrier. This has realized a simpler, more convenient and more controllable soldering process.

BRIEF DESCRIPTION OF DRAWINGS

In order to elaborate on the specific embodiments of the present disclosure or the technical solutions in the prior art more explicitly, the accompanying drawings in the presentation of the specific embodiments or the prior art will be briefly introduced below. Obviously, the accompanying drawings attached in the following description contain some embodiments of the present disclosure. For those of ordinary skill in the art, other drawings can also be concluded from these drawings without any creative work.

DESCRIPTION OF REFERENCE NUMERALS IN THE DRAWINGS

Figure 1:
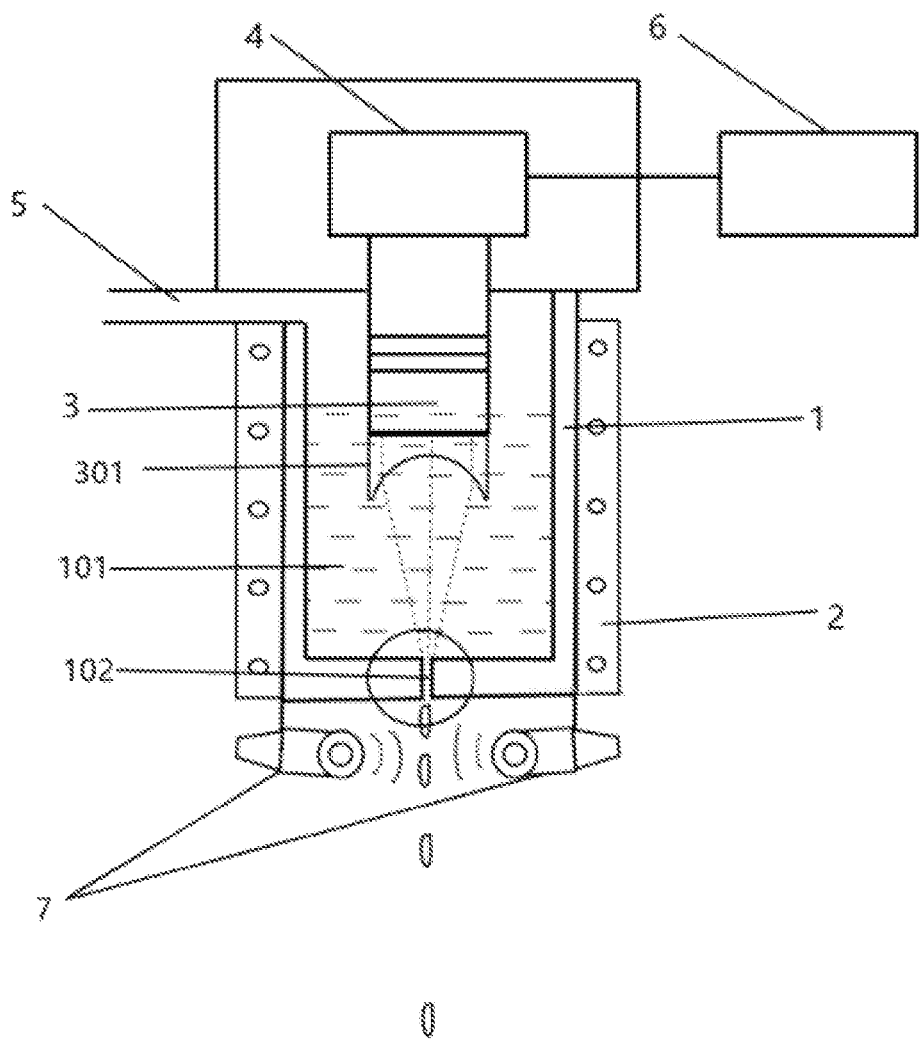
FIG. 1 is the sectional view of the liquid spray soldering device in embodiment 1 of the present disclosure.

1. Container; 101. Cavity; 102. Spraying hole; 2. Heating mechanism; 3. Ultrasonic focusing mechanism; 301. Ultrasonic focusing device; 4. Ultrasonic generating mechanism; 5. Gas booster; 6. Ultrasonic controlling mechanism; 7. Oxygen barrier mechanism; 701. Loudspeaker; 702. Acoustic cavity.

DETAILED DESCRIPTION OF THE PRESENT DISCLOSURE

The technical solutions of the present disclosure will be explicitly elaborated in their entirety below with relevant accompanying drawings. Obviously, the stated embodiments are a part of, rather than the whole of the possible embodiments of the present disclosure. Based on those of the present disclosure, all other embodiments obtained by those of ordinary skill in the art without creative work shall fall within the protection scope of the disclosure.

In the description of the present disclosure, it should be noted that the terms that indicate the relationship of orientation or position such as "center," "upper," "lower," "left," "right," "vertical," "horizontal," "inside," and "outside" are based on the relationship of orientation or position shown in the accompanying drawings. This is meant to facilitate and simplify the description of the present disclosure and not to imply that the indicated device or element shall have a specific orientation or shall be constructed and operated in a particular orientation. Therefore, it shall not be interpreted as a limitation of the present disclosure. Furthermore, the terms "first," "second," and "third" are used for description only and shall not be construed to indicate or imply relative importance.

In the description of the present disclosure, it should be noted that, unless otherwise expressly specified and limited, the terms "mount," "connect," and "link" shall be understood in a broad sense. For instance, they may be construed to indicate a fixed, detachable, integral, mechanical, or electrical connection; they may also refer to a direct or indirect connection through an intermediate medium or the internal linkage of two components. For those of ordinary skill in the art, the specific connotation of the aforesaid terms in the present disclosure should be understood on a case-by-case basis.

In addition, the technical features stated in the different embodiments of the present disclosure below can be combined with each other, as long as they do not conflict with one another.

The first embodiment of the present disclosure is a method for liquid spray soldering, comprised of the following steps:

S1: The solder materials to be spray-soldered are molten under the protection of an inert gas;

S2: Then the molten solder is spray-soldered under the condition of ultrasonic focusing;

In the present embodiment, the sprayed solder enters the oxygen barrier area with sonic waves, and spray soldering is conducted under the oxygen barrier condition for sonic waves; and the oxygen barrier area for sonic waves is a location with thin air covered by sonic waves.

In this embodiment, the spraying frequency of the molten solders can be controlled by changing the switching frequency of the spraying hole (102).

Figure 2:
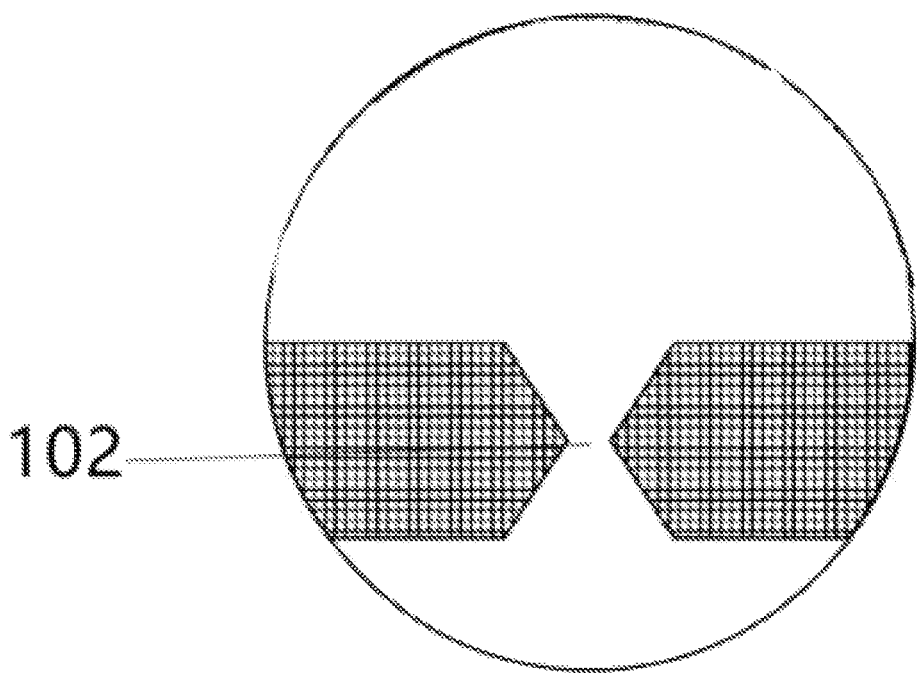
FIG. 2 is the enlarged schematic diagram of the circular portion in FIG. 1.
Figure 3:
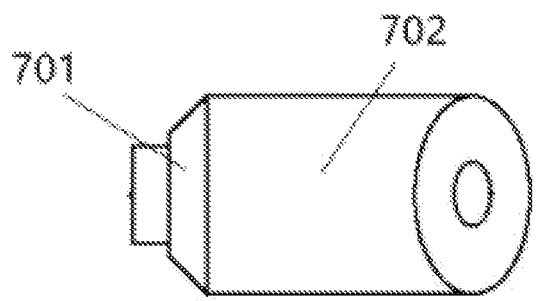
FIG. 3 is the partial structural representation of the oxygen barrier mechanism in FIG. 1.
Figure 4:
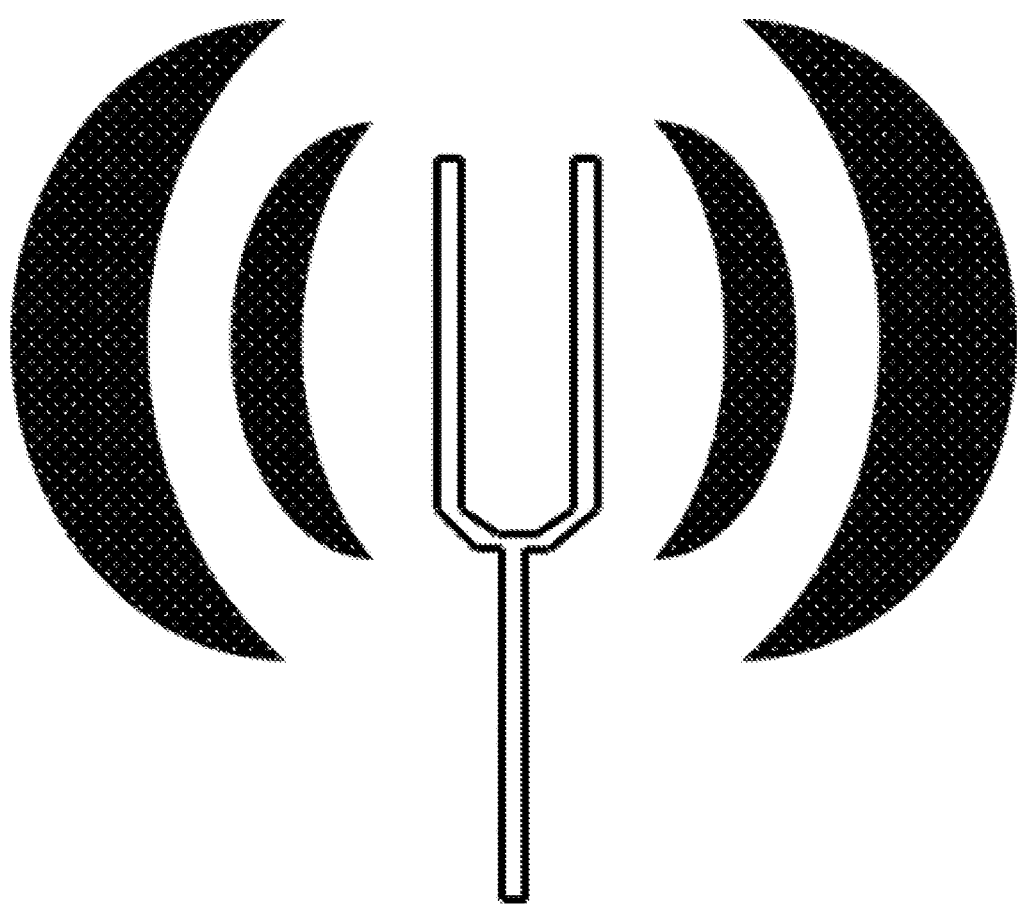
FIG. 4 is the schematic diagram of the oxygen barrier of sonic waves in the present disclosure.

The second embodiment of the present disclosure, as shown in FIGS. 1-4, is a device for liquid spray soldering comprised of:

a solder conversion mechanism that allows the solder materials to be spray-soldered to melt and consists of a container (1); the cavity (101) in the container (1) is used for placing solder materials; a spraying hole (102) is arranged at the bottom of the container (1) to connect with the cavity (101), and a heating mechanism (2) is mounted along the outer wall of the container (1);

a device for driving the solder spraying is equipped with the ultrasound generating (4) and controlling (6) mechanisms for controlling the frequency in the ultrasonic generating mechanism (4); one of these mechanisms extends into the cavity (101) and is immersed in the ultrasonic focusing mechanism (3) in the liquid solder; the ultrasonic focusing mechanism (3) includes an ultrasound focusing device (301) for focusing ultrasonic waves at the spraying hole (102);

With the aforesaid structure, ultrasonic focusing is used to drive the spray soldering process. It has properly resolved the problem of insufficient driving force of ultrasonic vibration extrusion spray droplets of conventional art when the diameter of spraying hole (102) is less than 50 μm.

In the present embodiment, under container (1), the oxygen barrier mechanism (7) is provided along both sides of the solder spraying path; the oxygen barrier mechanism (7) includes ultrasound generating and enhancing mechanisms for reinforcing the waves generated in the ultrasonic wave generating mechanism and for applying the effect of enhanced ultrasonic waves around the spraying hole (102).

With the aforesaid structure, the oxygen barrier mechanism (7), through its action on the air, enables a wave-shaped distribution of gas molecules in the air to form an area in which gas molecules are alternatively distributed in the dense and thin layers. The spraying hole (102) is located in the area with the thinly distributed gas molecules and placed under anti-oxygen protection. This enables the steady operation of the spraying process. The spraying hole (102) is placed under oxygen-barrier protection using ultrasonic waves. As a substitute for the conventional approach of filling inert gas or vacuuming, it has expanded the scope of application of the spray soldering technique, and reduced the complexity and cost of the oxygen-barrier protection for the spraying hole (102). This has realized a simpler, more convenient and a more controllable soldering process.

In this embodiment, the cavity (101) of the container (1) is connected to a gas booster (5) that has been filled with an inert gas under closed conditions and is used for enhancing the air pressure above the liquid level of solder materials in the cavity (101).

With the aforesaid structure, the gas booster (5) may lower the internal pressure of the container (1) due to the reduction of solder materials in the container (1). The gas booster (5) can improve the speed of solder spraying. It is necessary to avoid a drop in temperature of solder materials during the spraying process, because it will result in the unstable infiltration of soldering. Under this situation, the formed soldering and bonding layers will fail to meet requirements and affect the electrochemical performance, etc.

In this embodiment, the spraying hole (102) is small at its central diameter, and gradually increases in diameter from the middle to the inlet and outlet ends.

With the aforesaid structure, a spraying hole (102) is arranged at the bottom of the container (1); at the time of spraying solder materials, under the action of gravity, the speed of spraying is increased and the spraying hole (102) is set to that of an hourglass type; doing so can control the quantity and shape of sprayed solder and better meet needs of different scenarios.

In this embodiment, the ultrasonic generating mechanism (4) also includes a piezoelectric ceramic device controlled by pulse signals.

With the aforesaid structure, the piezoelectric ceramic device is controlled by pulse signals, which can convert electrical energy into mechanical energy. As the piezoelectric ceramic device vibrates at a frequency of 400 times/second, it can well control the frequency of spraying solder, so as to improve the speed and efficiency of soldering or additives.

In the present embodiment, a spraying switch capable of controlling the switching frequency is mounted on the spraying hole (102); the ultrasonic wave generating mechanism is a waveform generator; the ultrasonic wave enhancing mechanism is comprised of a loudspeaker (701) and a power amplifier. An acoustic cavity (702) is arranged between the speaker (701) and the waveform generating mechanism; the spraying holes (102) are arranged along the direction of gravity.

In the present embodiment, a heating mechanism (2) used for melting the solder materials is provided along the outer wall of the container (1), and a thermal insulation layer is also mounted.

With the aforesaid structure, container (1) is heated by electric heat which has advantages such as high thermal efficiency, rapid temperature elevation, high temperature, and is easily controlled. The thermal insulation layer can reduce the loss of heat.

In the present embodiment, a thermal insulator is mounted on the ultrasonic generating (4) and focusing (3) mechanisms.

With the aforesaid structure, the thermal insulator is configured to alleviate the effect of the heating mechanism (2) on the ultrasonic generating mechanism (4) and the ultrasonic focuser (3). This can prevent them from interruptions due to excessive temperature.

In this embodiment, container (1) is made of heating material, such as a crucible.

The application method of the device for the liquid spray soldering as stated in embodiment 2, is comprised of the following steps:

A1: The spraying hole (102) is closed and solid solder materials are added into the container (1);

A2: The heating mechanism (2) is turned on. This allows the solders to transform from a solid to a liquid state, and then keeps the solders in a liquid state constantly;

A3: The ultrasonic generating (4), controlling (6) and focusing (3) mechanisms are turned on; the ultrasound is focused on the spraying hole (102), and the spraying hole (102) is opened for spray soldering;

A4: A spraying switch is provided on the spraying hole (102); the switching frequency of the spraying hole (102) and the ultrasonic frequency of the ultrasonic generating mechanism (4) are adjusted to cause the two frequencies to become positively correlated;

A5: An oxygen barrier mechanism (7) is provided on both sides of the spraying path, and includes ultrasonic wave generating and enhancing mechanisms for reinforcing the waves generated in the ultrasonic wave generating mechanism and applying the effects of reinforced ultrasonic waves on the surroundings of the spraying hole (102); the air molecules in the space around the spraying hole (102) form air waves under the action of ultrasound. Accordingly, the spraying hole (102) is located at a place where the air is thin in the air wave. This can isolate the spraying hole (102) from oxygen in the ambient atmosphere, until the spray soldering is completed.

The device for liquid solder in the present disclosure can control the spraying frequency of the liquid solder. Because it is possible to set the small diameter of the spraying hole (102), it is applicable to the soldering of devices with densely distributed solder joints, and the printing of electronic circuits. This can expand the scope of application. Meanwhile, high vertical concentricity is not affected by other factors and surfacing is allowed during continuous soldering. This technique can be thus widely used in chip packaging, additive manufacturing and other fields.

Obviously, the foregoing embodiments are intended only to elaborate the examples listed, rather than to restrict the mode of implementation. For those of ordinary skill in the art, changes or modifications in other forms can also be made on the basis of the foregoing description. It is not necessary to give an exhaustive list of all implementation modes. Any obvious changes or modifications derived therefrom still fall within the protection scope of the present disclosure.

The invention claimed is:

1. A method for liquid spray soldering is characterized in that it is comprised of the following steps:
   S1: a solder to be spray-soldered is melted under a protection of an inert gas to obtain a melted solder;
   S2: then, the melted solder is spray-soldered using ultrasonic focusing thus producing a sprayed solder;
   S3: the sprayed solder enters an oxygen barrier area, and is spray-soldered under the oxygen barrier area with sonic waves to solder devices with solder joints;
   to perform the steps, a device for liquid spray soldering is used, including:
   a solder conversion mechanism that has the solder to be spray-soldered to melt and consists of a container (1); where a cavity (101) in the container (1) is used for placing solder materials; a spraying hole (102) is arranged at the bottom of the container (1) to connect with the cavity (101), and a heating mechanism (2) used for melting solder is mounted along an outer wall of the container (1);
   a device for driving the solder while being sprayed is equipped with an ultrasonic generating mechanism (4), and an ultrasonic controlling mechanism (6) for controlling the ultrasonic frequency in the ultrasonic generating mechanism (4); one of these mechanisms extends into the cavity (101) and is immersed in an ultrasonic focusing mechanism (3) which focuses the ultrasound (3) in the liquid solder, the ultrasonic focusing mechanism (3) includes an ultrasonic focusing device (301) for focusing ultrasonic waves at the spraying hole (102);
   along the spraying path of the solder, an oxygen barrier mechanism (7) is provided on both sides of the spraying path; the oxygen barrier mechanism (7) includes mechanisms that generate and strengthen sound waves for enhancing the sonic waves produced in a sonic wave generating mechanism and for applying the strengthened effects of sonic waves around the spraying hole (102).

2. The method for liquid spray soldering as stated in claim 1 wherein a switching frequency of the spraying hole (102) is set, when the melted solder is sprayed through the spraying hole (102).

3. The method for liquid spray soldering as stated in claim 1 wherein the oxygen barrier area for sonic waves is a place with air covered by sonic waves.

4. The method for liquid spray soldering as stated in claim 1 wherein the cavity (101) of the container (1) connects with a gas booster (5) which has been filled with an inert gas under a closed condition and is used for enhancing a liquid level of the melted solder in the cavity (101).

5. The method for liquid spray soldering as stated in claim 1 wherein the spraying hole (102) has a small diameter at a central location, which gradually increases from a middle to the inlet and outlet ends.

6. The method for liquid spray soldering as stated in claim 1 wherein the ultrasonic generating mechanism (4) further is comprised of a piezoelectric ceramic device controlled by pulse signals; the container (1) is a crucible; a spraying switch capable of controlling a switching frequency is provided on the spraying hole (102); the sonic wave enhancing mechanism is comprised of a loudspeaker (701) and a power amplifier; an acoustic cavity (702) is arranged between the waveform generator and the loudspeaker (701); the spraying hole (102) is arranged along the direction of the gravity; a heat insulator is mounted on the ultrasonic generating mechanism (4) and the ultrasonic focusing mechanism (3); a thermal insulation layer is provided outside the container (1).

* * * * *